United States Patent
Staubach et al.

(10) Patent No.: US 10,914,242 B2
(45) Date of Patent: Feb. 9, 2021

(54) COMPLEX AIR SUPPLY SYSTEM FOR GAS TURBINE ENGINE AND ASSOCIATED AIRCRAFT

(71) Applicant: United Technologies Corporation, Farmington, CT (US)

(72) Inventors: Joseph Brent Staubach, Colchester, CT (US); Nathan Snape, Tolland, CT (US); Frederick M. Schwarz, Glastonbury, CT (US); Charles E. Lents, Amston, CT (US); Michael K. Ikeda, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 370 days.

(21) Appl. No.: 15/823,639

(22) Filed: Nov. 28, 2017

(65) Prior Publication Data
US 2019/0162121 A1 May 30, 2019

(51) Int. Cl.
*F02C 9/18* (2006.01)
*F02C 7/18* (2006.01)
(Continued)

(52) U.S. Cl.
CPC ............... *F02C 9/18* (2013.01); *B64D 13/00* (2013.01); *B64D 33/02* (2013.01); *F02C 7/14* (2013.01); *F02C 7/18* (2013.01); *F02C 7/185* (2013.01); *F02C 7/224* (2013.01); *F02C 7/32* (2013.01); *B64D 2013/0618* (2013.01); *B64D 2013/0648* (2013.01); *B64D 2033/024* (2013.01);
(Continued)

(58) Field of Classification Search
CPC ...... F02C 9/18; F02C 7/14; F02C 7/18; F02C 7/185; F02C 7/224; F02C 7/32; B64D 13/00; B64D 13/02; B64D 13/0648
See application file for complete search history.

(56) References Cited

U.S. PATENT DOCUMENTS

| 5,285,626 A * | 2/1994 | Leeson | F02C 7/32 60/39.183 |
|---|---|---|---|
| 5,392,595 A | 2/1995 | Glickstein | |

(Continued)

FOREIGN PATENT DOCUMENTS

EP 0888966 A2 1/1999

OTHER PUBLICATIONS

European Search Report for EP Application No. 18208970.6 dated Mar. 29, 2019.

*Primary Examiner* — Craig Kim
(74) *Attorney, Agent, or Firm* — Carlson, Gaskey & Olds, P.C.

(57) ABSTRACT

A lower pressure tap is connected to a first heat exchanger to be cooled by cooling air, and then to a selection valve. The selection valve selectively delivers the lower pressure tap air to a boost compressor. The lower pressure tap air downstream of the boost compressor is connected to cool the at least one turbine. The selection valve also selectively delivers a portion of the lower pressure tap air across a first cooling turbine, and to a line associated with an air delivery system for a cabin on an associated aircraft. A portion of the air downstream of the first cooling turbine is connected to a second cooling turbine, and air downstream of the second cooling turbine is connected for use in a cold loop A method of operating an air supply system is also disclosed.

20 Claims, 3 Drawing Sheets

(51) Int. Cl.
*B64D 33/02* (2006.01)
*B64D 13/00* (2006.01)
*F02C 7/14* (2006.01)
*F02C 7/32* (2006.01)
*F02C 7/224* (2006.01)
*F02C 3/04* (2006.01)
*F02C 7/22* (2006.01)
*B64D 13/06* (2006.01)

(52) U.S. Cl.
CPC ...... *F02C 3/04* (2013.01); *F02C 7/22* (2013.01); *F05D 2220/323* (2013.01); *F05D 2220/62* (2013.01); *F05D 2220/76* (2013.01); *F05D 2240/35* (2013.01); *F05D 2260/213* (2013.01)

(56) References Cited

U.S. PATENT DOCUMENTS

| | | | | |
|---|---|---|---|---|
| 5,452,573 | A | * | 9/1995 | Glickstein ............. F02C 6/08 60/39.183 |
| 5,488,823 | A | | 2/1996 | Faulkner et al. |
| 5,899,085 | A | * | 5/1999 | Williams ............. B64D 13/06 62/236 |
| 2002/0162914 | A1 | * | 11/2002 | Albero ............. B64D 13/06 244/53 R |
| 2004/0011018 | A1 | * | 1/2004 | Bouiller ............. F01D 15/08 60/39.08 |
| 2013/0187007 | A1 | * | 7/2013 | Mackin ............. F02C 6/08 244/134 R |
| 2015/0233291 | A1 | | 8/2015 | Pelagatti et al. |
| 2016/0237908 | A1 | * | 8/2016 | Snape ............. F02C 6/08 |
| 2016/0312711 | A1 | * | 10/2016 | Suciu ............. F02C 7/143 |

\* cited by examiner

COMPLEX AIR SUPPLY SYSTEM FOR GAS TURBINE ENGINE AND ASSOCIATED AIRCRAFT

BACKGROUND

This application relates to an air supply system for an engine and aircraft.

Gas turbine engines are known and typically include a fan delivering air into the bypass duct and into a core engine. In the core engine, air is compressed and then driven into a combustor where it is mixed with fuel and ignited. Products of this combustion pass downstream over turbine rotors driving them to rotate.

As can be appreciated, a number of components in a gas turbine engine need cooling air. As the power developed by gas turbine engines increases, these cooling loads become greater and meeting the loads becomes more complex.

In addition, a gas turbine engine is typically relied upon to supply air for a number of uses on an associated aircraft. As an example, air is supplied to an aircraft cabin. Further, air is supplied for cooling a number of components associated with the aircraft.

SUMMARY

In a featured embodiment, an aircraft air supply system has a gas turbine engine including a fan and at least one compressor, the at least one compressor driven by at least one turbine section, and a combustor for combusting air from the at least one compressor and delivering it across at least one turbine. A lower pressure tap is within at least one compressor, and the lower pressure tap air is connected to a first heat exchanger to be cooled by cooling air, and then to a selection valve. The selection valve selectively delivers the lower pressure tap air to a boost compressor. The lower pressure tap air downstream of the boost compressor is connected to cool the at least one turbine. The selection valve also selectively delivers a portion of the lower pressure tap air across a first cooling turbine, and to a line associated with an air delivery system for a cabin on an associated aircraft. A portion of the air downstream of the first cooling turbine is connected to a second cooling turbine, and air downstream of the second cooling turbine is connected for use in a cold loop such that the lower pressure tap air downstream of the second cooling turbine is at a lower temperature than air downstream of the first cooling turbine.

In another embodiment according to the previous embodiment, the lower pressure tap air downstream of the selection valve connected to the first cooling turbine is connected through a fuel heat exchanger, and fuel from a fuel tank connected through the fuel heat exchanger to be heated by the lower pressure tap air in the line heading to the first cooling turbine, and the fuel then is connected to the combustor.

In another embodiment according to any of the previous embodiments, at least one of the first and second cooling turbines has a shaft configured to recapture rotational energy.

In another embodiment according to any of the previous embodiments, at least one shaft from the first and second cooling turbines being connected into a gearbox, such that the rotation can be recaptured.

In another embodiment according to any of the previous embodiments, the first and second cooling turbines rotate on a single shaft.

In another embodiment according to any of the previous embodiments, the first and second cooling turbines rotate on concentrically mounted shafts.

In another embodiment according to any of the previous embodiments, at least one of the first and second cooling turbines connected to drive a generator.

In another embodiment according to any of the previous embodiments, at least one of the first and second cooling turbines is provided with a control to selectively change an effective flow area at at least one of an inlet or an outlet of the at least one of the first and second cooling turbines.

In another embodiment according to any of the previous embodiments, a clutch selectively stops rotation of the boost compressor.

In another embodiment according to any of the previous embodiments, the selection valve is caused to deliver no air to the boost compressor when the boost compressor is not rotating.

In another embodiment according to any of the previous embodiments, there is a higher air pressure tap which is connected into a mixing chamber to mix with the lower pressure tap air downstream of the boost compressor and mixed air downstream of the mixing chamber being connected to cool the at least one turbine.

In another embodiment according to any of the previous embodiments, higher pressure air is tapped at a pressure higher than the lower pressure tap, and is connected to selectively pass through the first heat exchanger when a lower power operation valve is open, when the gas turbine engine is operating at lower power operation, and a preventative valve is placed on the lower pressure tap to block flow when the lower power operation valve is open.

In another embodiment according to any of the previous embodiments, a bypass valve is placed on the line delivering air to the first cooling turbine and the bypass valve selectively bypassing air around the first cooling turbine to a line leading directly to the second cooling turbine.

In another embodiment according to any of the previous embodiments, temperature sensors are associated with components cooled by the cool loop, and communicate with a control for at least the selection valve, to control the airflow being delivered to the cold loop.

In another featured embodiment, a method of operating an air supply system on an aircraft includes tapping a lower pressure air from at least one compressor in a gas turbine engine, and delivering the lower pressure tap air through a first heat exchanger to be cooled by cooling air, then to a selection valve, controlling the selection valve for delivering the lower pressure tap air to a boost compressor, and delivering air downstream of the boost compressor to cool at least one turbine associated with the gas turbine engine. The selection valve also selectively delivers a first portion of the lower pressure tap air across a first cooling turbine, and delivers the air downstream of the first cooling turbine to a cabin on an associated aircraft, and a second portion of air downstream of the first cooling turbine is delivered across a second cooling turbine, and air downstream of the second cooling turbine being delivered for use in a cool loop.

In another embodiment according to any of the previous embodiments, rotational energy is recaptured from at least one of the first and second cooling turbines.

In another embodiment according to any of the previous embodiments, at least one of the first and second cooling turbines has a shaft providing a drive input into a gear box for driving the boost compressor.

In another embodiment according to any of the previous embodiments, at least one of the first and second cooling turbines driving a shaft which in turn drives a generator, recapturing the energy.

In another embodiment according to any of the previous embodiments, higher pressure air is tapped from the at least one compressor and selectively delivered to the selection valve when the gas turbine engine is at lower power operation, and blocks flow from the lower pressure tap when the higher pressure air is being delivered to the selection valve.

In another embodiment according to any of the previous embodiments, selectively bypassing air leading to the first cooling turbine to a line leading to the second cooling turbine.

These and other features may be best understood from the following drawings and specification.

BRIEF DESCRIPTION OF THE DRAWINGS

FIG. 4 shows further features.

DETAILED DESCRIPTION

Figure 1:
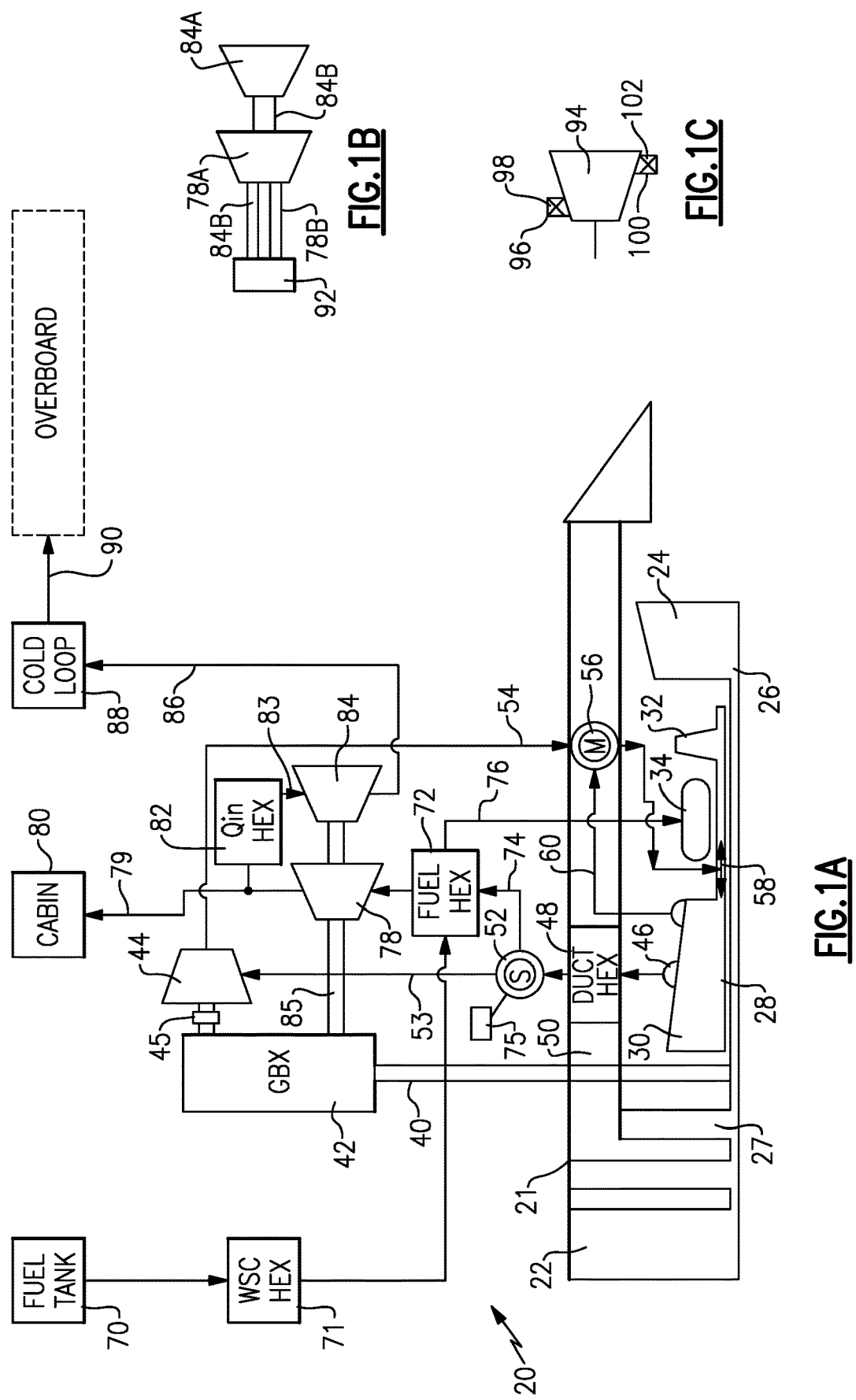
FIG. 1A schematically shows an air supply system for a gas turbine engine and associated aircraft.
FIG. 1B shows an option.
FIG. 1C shows another option.

An aircraft 20 as shown in FIG. 1A has a gas turbine engine 21 with a fan 22 driven by a fan drive turbine 24 through a spool shaft 26. A low pressure compressor 27 may also be driven by the turbine 24.

A higher speed shaft 28 drives a compressor 30 and is driven by a high pressure turbine 32. A combustor 34 is intermediate the compressor 30 and turbine 32.

It should be understood that teachings of this disclosure could extend to any number of engine types for use on an aircraft. As an example, the teachings of this disclosure will benefit both commercial aircraft engines and military style engines.

Air is tapped at 46 from an intermediate location in the compressor 30 and cooled in a heat exchanger 48. Heat exchanger 48 is exposed to fan cooling air in a duct 50. This may be the so-called bypass duct of a large commercial engine or a third stream of a military style engine.

The tapped air having been cooled passes to a selection valve 52. Selection valve 52 is shown with a control 75. It should be understood that a number of the components in the disclosed system may be provided with controls and this could all be the same control 75, which, in at least one embodiment, might be a full authority digital electronic controller (FADEC) for the entire engine.

Air at 53 downstream of the selection valve 52 passes through a centrifugal compressor 44. Compressor 44 is driven by a gearbox 42, which may be driven by a takeoff shaft 40. Takeoff shaft 40 is illustrated driven by the spool shaft 26. However, it should be understood the takeoff shaft 40 could also be driven by the spool shaft 28. In addition, the compressor 44 could alternatively be driven by electric, hydraulic or fuel powered motors. In addition, a clutch 45 is shown schematically and may be open when it is not necessary to further increase the pressure of the air at line 53. Compressor 44 may alternatively be driven by shaft 85.

Selection valve 52 may be electric, hydraulic, or fluid driven. When the compressor 44 is turned off, the valve 52 may be controlled to not deliver air into line 53.

Air 54 downstream of the compressor 44 is delivered into a mixing chamber 56. Air from a tap 60, which is higher pressure than tap 46, is also delivered into mixing chamber 56. The mixed air then passes as shown at 58 to cool the high pressure compressor 28 and/or the turbine 24. Alternatively, the air can pass inwardly, and to turbine 24 downstream of the combustor.

The selection valve 52 is also shown to selectively deliver air into a line 74 leading into a fuel heat exchanger 72. As shown, a fuel tank 70 may deliver fuel through a heat exchanger 71 at which the fuel is heated. The fuel and heat exchanger 72 is further heated by the air in line 74. That fuel then passes into a line 76 heading to the combustor 34.

The air downstream of the fuel heat exchanger 72 passes across a first turbine 78. A line 79 downstream of turbine 78 may be utilized to supply cabin air for the aircraft cabin 80.

A portion of the air delivered downstream of turbine 78 may branch off and pass through a heat exchanger 82. The air exiting turbine 78 is cold and available to use as a heat sink, and its pressure is still high. Heat exchanger 82 thus provides a cooling site at little pressure drop for turbine 84 to expand. Heat exchanger 82 can thus be used for any number of cooling purposes. That line then passes across a second turbine 84. Air downstream of the turbine 84 may be utilized for a cold loop 88.

It should be understood the air downstream of the turbine 84 will be cooled far below the temperature of the air in line 79 due to the extra expansion. Thus, the cold loop sees cooling air with a much greater capacity for cooling. The cold loop may be utilized to cool various components such as electric controls, aircraft subsystems, mission equipment such as radar, weapons systems, and for any number of other systems on the engine. The cool loop may cool fuel as aircraft 20 loiters over an area, and use the cold fuel as a heat sink at high speed operation where the total temperature of the air will be hot so that a sink is valuable.

In another embodiment, line 79 can be heated in heat exchanger 82, allowing control of cabin inlet temperature. The uses of the different heat exchangers means that the air further downstream of the two turbines may be at any number of relative temperatures. However, immediately downstream of the second turbine the air is at a lower temperature than the air immediately downstream of the first turbine.

Air at 90 may then be dumped overboard and at, or slightly above, ambient pressure.

The turbines 78 and 84 are shown with a single drive shaft 85 which passes rotation energy back into the gearbox 42. A worker in the art would understand how to connect the shaft 85 into gearbox 42 to recapture the energy. Thus, some of the energy from the expansion of the air across turbine 78 and 84 is regained and may be recaptured by the engine to improve efficiency.

The turbine 84 may have a flow path area that is at least ten percent larger than the flow path area of turbine 78.

FIG. 1B shows an option wherein the turbine 78 and 84 are replaced by turbines 78A and 84A. Turbine 84A drives its own shaft 84B and turbine 78A drives its shaft 78B. The shafts are shown as concentric, although they could also be spaced. Further, the shafts are shown connected to drive a generator 92. Utilizing separate shafts will provide the designer with the ability to design to an aerodynamic design point for the engine.

FIG. 1C shows that the flow capacity of either turbine can be provided with systems that can be varied to reduce any aerodynamic mismatch of the oncoming flow to the rotor speed as the flow capacity per unit area may be reduced. As an example, an inlet 98 to a turbine 94 is shown with an inlet vane 96 and the control 75 may vary the angle of the inlet vane to control flow capacity per unit area. In addition, or alternatively, an outlet 100 of the turbine 94 may be provided with a device 102 that will restrict and reduce turbine exit flow capacity.

A worker of ordinary skill in the art would recognize when such control would be indicated.

Figure 2:
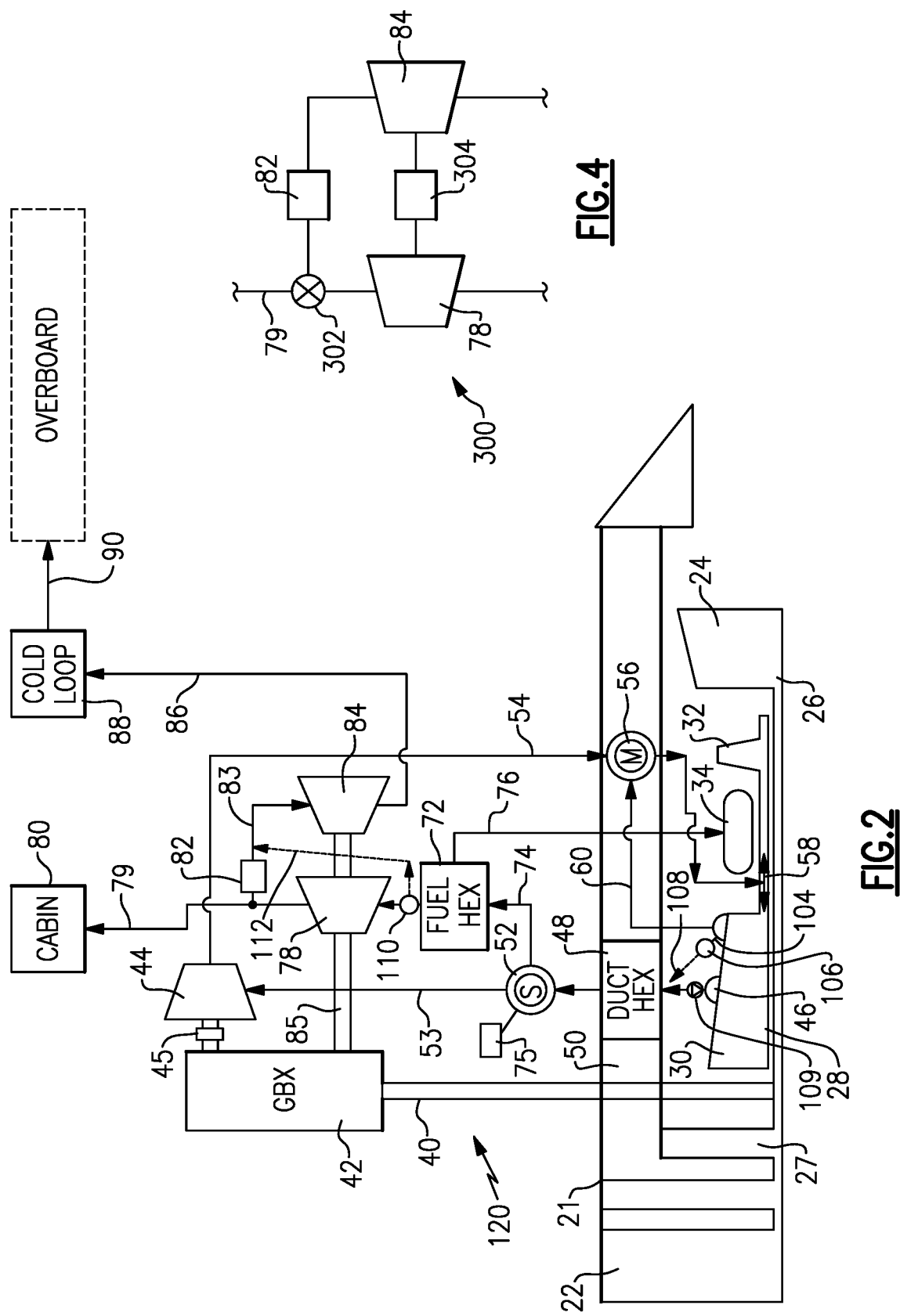
FIG. 2 shows further optional features.

FIG. 2 shows an engine 120 which is similar in many respects to the engine of FIG. 1A. However, a secondary high pressure tap 104 passes through a valve 106 to the heat exchanger 48. Such a tap would provide the designer with the ability to achieve higher pressure air for the several cooling uses at lower power operation. With such a system, a check valve 109 might be indicated on the tap at 46 to prevent backflow.

In addition, another bypass valve 110 is shown which selectively bypasses a portion of the air into line 112 and around the turbine 78. The air will then pass into line 83 and head to turbine 84. Note the line is shown downstream of the heat exchanger 82.

The valve 110 can be turned to block flow through one of its downstream paths should there be a system failure.

The branch from valve 52 to compressor 44, and then mixing chamber 56 may be useful to cool the high pressure turbine and a back end of the high pressure compressor, for example during a hot day takeoff to control turbine and compressor temperatures. At lower power, the branch from valve 52 to compressor 44, may be cut off since the engine is using less thrust. More flow to turbine 84 may be desirable to create a cold fuel reservoir for later use. Some flow to cabin 80 may be required at all times so the valve 52 may turn off flow to line 53 but not to turbine 78 and cabin 80.

Notably, the airflow into line 74 is preferably never shut off as the cabin 80 will always require air.

Figure 3:
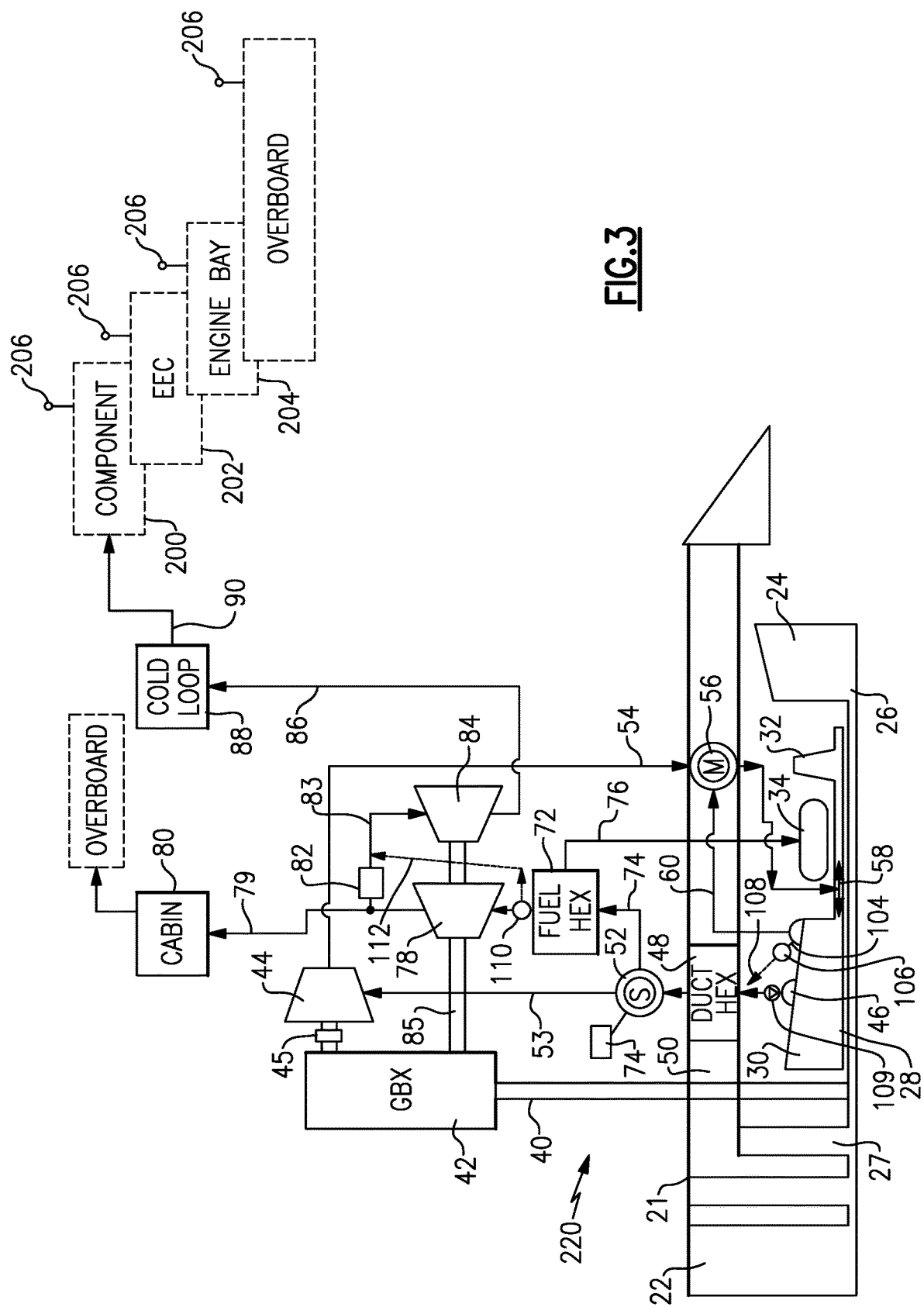
FIG. 3 shows further features.

FIG. 3 shows an aircraft 220 wherein the cold loop 88 has a component 200 for cooling, and an electronic engine control 202, and an engine bay 204. These are examples of things that may be cooled by the cold loop 88. As shown, temperature sensors 206 are associated with these locations.

The control for the aircraft 220 may be provided with a control logic that can manipulate each of the several valves based upon the temperature at the components. Further, the control logic may be programmed to provide sufficient cooling to ensure desired component life, regulate the total system performance, and accommodate component temperature limits and life goals.

FIG. 4 shows an embodiment 300 which may be incorporated into an engine that is otherwise similar to the earlier described engine. However, a valve 302 is positioned upstream of the heat exchanger 82, and can block flow to the turbine 84. A clutch 304 would selectively disconnect the turbine 84 under such conditions. This may be generally valuable such as when the associated aircraft is in a ferry mode, and chilled fuel is not desired, but greater range would be desirable.

A method of operating an air supply system on an aircraft includes tapping a lower pressure air from at least one compressor in a gas turbine engine, and delivering the lower pressure tap air through a first heat exchanger to be cooled by cooling air, then to a selection valve. The selection valve is controlled for delivering the lower pressure tap air to a boost compressor, and delivering air downstream of the boost compressor to cool at least one turbine associated with the gas turbine engine. The selection valve also selectively delivers a portion of the lower pressure tap air across a first cooling turbine, and delivers the air downstream of the first cooling turbine to a cabin on an associated aircraft. A second portion of air downstream of the first cooling turbine is delivered across a second cooling turbine, and air downstream of the second cooling turbine is delivered for use in a cool loop.

Control 75 may include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller may be a hardware device for executing software, particularly software stored in memory. The processor can be a custom made or commercially available processor, a central processing unit (CPU), an auxiliary processor among several processors associated with the controller, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, etc.). Moreover, the memory may incorporate electronic, magnetic, optical, and/or other types of storage media. The memory can also have a distributed architecture, where various components are situated remotely from one another, but can be accessed by the controller.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The input/output devices that may be coupled to system I/O Interface(s) may include input devices, for example, but not limited to, a scanner, microphone, camera, proximity device, etc. Further, the input/output devices may also include output devices, for example but not limited to a display, etc. Finally, the input/output devices may further include devices that communicate both as inputs and outputs, for instance but not limited to, a modulator/demodulator (for accessing another device, system, or network), a radio frequency (RF) or other transceiver, a bridge, a router, etc.

When the controller is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. An aircraft air supply system comprising:
a gas turbine engine including a fan and at least one compressor, the at least one compressor driven by at least one turbine section, and a combustor for combusting air from the at least one compressor and delivering it across at least one turbine;
a lower pressure tap within the at least one compressor, and the lower pressure tap air being connected to a first heat exchanger to be cooled by cooling air, and then to a selection valve, the selection valve selectively delivering the lower pressure tap air to a boost compressor, and lower pressure tap air downstream of the boost compressor being connected to cool the at least one turbine; and
the selection valve for also selectively delivering the lower pressure tap air across a first cooling turbine, and downstream of said first cooling turbine, the air then passing to a line associated with an air delivery system for a cabin on an associated aircraft, and a portion of the air downstream of the first cooling turbine being connected to a second cooling turbine, and air downstream of the second cooling turbine being connected for use in a cold loop such that the lower pressure tap air downstream of the second cooling turbine is at a lower temperature than air downstream of the first cooling turbine.

2. The aircraft air supply system as set forth in claim 1, wherein the lower pressure tap air downstream of the selection valve connected to the first cooling turbine is connected through a fuel heat exchanger, and fuel from a fuel tank connected through the fuel heat exchanger to be heated by the lower pressure tap air in the line heading to the first cooling turbine, and the fuel then being connected to the combustor.

3. The aircraft air supply system as set forth in claim 1, wherein at least one of the first and second cooling turbines has a shaft configured to recapture rotational energy.

4. The aircraft air supply system as set forth in claim 3, wherein at least one shaft from the first and second cooling turbines being connected into a gearbox, such that the rotation can be recaptured.

5. The aircraft air supply system as set forth in claim 3, wherein the first and second cooling turbines rotate on a single shaft.

6. The aircraft air supply system as set forth in claim 3, wherein the first and second cooling turbines rotate on concentrically mounted shafts.

7. The aircraft air supply system as set forth in claim 3, wherein the at least one of the first and second cooling turbines connected to drive a generator.

8. The aircraft air supply system as set forth in claim 1, wherein at least one of the first and second cooling turbines is provided with a control to selectively change an effective flow area at at least one of an inlet or an outlet of the at least one of the first and second cooling turbines.

9. The aircraft air supply system as set forth in claim 1, wherein a clutch selectively stops rotation of the boost compressor.

10. The aircraft air supply system as set forth in claim 9, wherein the selection valve is caused to deliver no air to the boost compressor when the boost compressor is not rotating.

11. The aircraft air supply system as set forth in claim 1, wherein there is a higher air pressure tap which is connected into a mixing chamber to mix with the lower pressure tap air downstream of the boost compressor and mixed air downstream of the mixing chamber being connected to cool the at least one turbine.

12. The aircraft air supply system as set forth in claim 1, wherein higher pressure air is tapped at a pressure higher than the lower pressure tap, and is connected to selectively pass through the first heat exchanger when a lower power operation valve is open, when the gas turbine engine is operating at lower power operation, and a preventative valve is placed on the lower pressure tap to block flow when the lower power operation valve is open.

13. The aircraft air supply system as set forth in claim 1, wherein a bypass valve is placed on the line delivering air to the first cooling turbine and the bypass valve selectively bypassing air around the first cooling turbine to a line leading directly to the second cooling turbine.

14. The aircraft air supply system as set forth in claim 1, wherein temperature sensors are associated with components cooled by the cool loop, and communicate with a control for at least the selection valve, to control the airflow being delivered to the cold loop.

15. A method of operating an air supply system on an aircraft comprising:
tapping a lower pressure air from at least one compressor in a gas turbine engine, and delivering the lower pressure tap air through a first heat exchanger to be cooled by cooling air, then to a selection valve, controlling the selection valve for delivering the lower pressure tap air to a boost compressor, and delivering air downstream of the boost compressor to cool at least one turbine associated with the gas turbine engine; and
the selection valve also selectively delivering a first portion of the lower pressure tap air across a first cooling turbine, and delivering the air downstream of the first cooling turbine to a cabin on an associated aircraft, and a second portion of air downstream of the first cooling turbine being delivered across a second cooling turbine, and air downstream of the second cooling turbine being delivered for use in a cool loop.

16. The method as set forth in claim 15, wherein rotational energy is recaptured from at least one of the first and second cooling turbines.

17. The method as set forth in claim 16, wherein the at least one of the first and second cooling turbines has a shaft providing a drive input into a gear box for driving the boost compressor.

18. The method as set forth in claim 16, wherein the at least one of the first and second cooling turbines driving a shaft which in turn drives a generator, recapturing the energy.

19. The method as set forth in claim 15, wherein tapping higher pressure air from the at least one compressor and selectively delivering the higher pressure tap air to the selection valve when the gas turbine engine is at lower power operation, and blocking flow from the lower pressure tap when the higher pressure air is being delivered to the selection valve.

20. The method as set forth in claim 15, wherein selectively bypassing air leading to the first cooling turbine to a line leading to the second cooling turbine.

* * * * *